March 15, 1966 D. GOSSEL 3,241,087
VARIABLE FREQUENCY TRANSISTOR MULTIVIBRATOR
Filed April 22, 1963 2 Sheets-Sheet 1

INVENTOR.
DIETER GOSSEL
BY
Frank R. Trifari
AGENT

INVENTOR.
DIETER GOSSEL
BY
Frank R. Jirfani
AGENT

United States Patent Office 3,241,087
Patented Mar. 15, 1966

3,241,087
VARIABLE FREQUENCY TRANSISTOR MULTIVIBRATOR

Dieter Gossel, Hamburg-Lockstedt, Germany, assignor to North American Philips Company, Inc., New York, N.Y., a corporation of Delaware Filed Apr. 22, 1963, Ser. No. 274,522
Claims priority, application Germany, May 2, 1962, P 29,301
9 Claims. (Cl. 331—113)

Astable and monostable multivibrators including two transistors having their collectors and bases coupled in a cross-wise manner are known. In such multivibrators there is usually a good linear relationship between the frequency and the discharge voltage if the discharge voltage is high relative to the charging voltage, but frequency variations higher than of the order of 1:10 are rarely obtained with them. Greater variations in frequency may be obtained by using two charging time-constants which are active at high and low frequencies respectively. However, the frequency-control characteristic is extremely non-linear in the range where the actions of the two time constants relieve each other, which is very disadvantageous for certain uses.

The present invention relates to astable or monostable multivibrator including two transistors having their collectors and bases cross coupled, the operating frequency or delay time of which is adjustable within wide limits by varying the base resistors. It is characterised in that a variable common base resistor is connected to the bases of the transistors through diodes which alternately connect the base resistor to the base of the transistor which is cut-off and in that special switching means are provided for over driving during the periods of conduction. The function of over driving or causing saturation of the transistors during their period of conduction formerly fulfilled by the base-resistors is with the novel circuit transferred to other structural elements.

Due to this repartition of the functions, it is possible for the base resistor to be varied within wide limits since no restricting condition is imposed by the necessity of over driving. The possibility of varying the base-resistor within wide limits implies, however, a possibility of large frequency-variation.

The novel multivibrator permits a good linear frequency-control of at least 1:1000 and is therefore especially suitable as a simple pulse generator for general measuring and test purposes since switching-over of the range is not necessary. Further advantageous domains of application of the multivibrator, the frequency variation of which can be controlled continuously, reside in the digital measuring and regulating technique, as a variable source of nominal frequency, as a current/frequency or voltage/frequency converter because of the good linear control-characteristic, as well as in digital regulating circuits for the aperiodic multiplication of frequency by frequency division in the feedback circuit. In the monostable type of multivibrator, the frequency variation corresponds to a variation in delay time. Since transistors are over driven during their period of conduction and, because of their low residual voltages, have switching properties considerably more favourable than those of tubes, they are in many cases preferable to the latter.

In order that the invention may be readily carried into effect, it will now be described in detail, by way of example, with reference to the accompanying diagrammatic drawings, in which.

Figure 1:
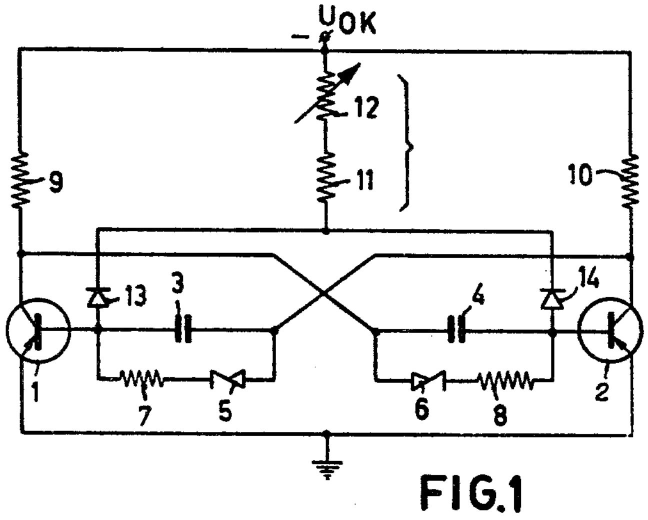
FIGURE 1 shows a circuit arrangement having Zener diodes.

In the circuit arrangement shown in FIG. 1, transistors 1 and 2 are coupled in a crosswise manner through capacitors 3 and 4 connected between the collector of one transistor and the base of the other transistor. A series-combination of Zener diodes 5 and 6 and resistors 7 and 8 is connected in parallel with the capacitors 3 and 4 respectively. The emitters of the transistors are both connected to earth and their collectors are connected through resistors 9 and 10 respectively to a voltage terminal $U_{OK}$ to which is also connected the series-combination of a fixed base resistor 11 and a variable base resistor 12, which series-combination is in turn connected to the bases of the transistors through diodes 13 and 14 respectively.

The Zener diodes 5 and 6 may be regarded, as far as their operation is concerned, as switches parallel with the coupling capacitors 3 and 4 respectively.

The capacitor is initially normally charged, for example through the emitter-base path of transistor 2. The voltage across capacitor 4 increases and the base current correspondingly decreases. At a given instant $t=t_Z$, however, the voltage of the capacitor reaches the breakdown voltage $U_Z$ of the Zener diode 6. This Zener diode 6 becomes conducting, terminates the charging process and conveys, up to the end of the period of conduction of transistor 2, the constant base current which is equal to $U_{OK}-U_{Z6}$ divided by the ohmic value of resistor 9 plus, if desired, the ohmic value of resistor 8 which must be so proportioned that transistor 2 remains over driven.

The discharge of capacitor 4 proceeds in quite the normal way (transistor 1 conducting, transistor 2 cut off), since the Zener diode 6 is immediately cut-off when the voltage becomes lower than $U_Z$. This behaviour corresponds to the opening of a switch connected in parallel with capacitor 4.

The frequency control is effected by varying the base resistors. Since symmetrical circuits are considered, a double potentiometer would be required. Maintaining constancy of the ratio between the width of the pulse and the recurrence period of the pulse requires that the resistance paths of such a double potentiometer have the same resistance variation as a function of the angle of rotation. This is not easy to realize, especially for values higher than 100,000 ohms, and necessitates the use of expensive potentiometers adapted to be partially compensated.

It is possible, however, to omit the one variable base-resistor and adjoin the other alternately to the transistor which is cut-off if the resistors 11, 12 are connected through diodes 13, 14. Of the diodes 13 and 14, that one is always conducting the anode of which is positive relative to earth.

The circuit arrangement described permits obtaining with ease continuously-controllable frequency variations of up to 1:250, the current gain factor of the transistors having to be approximately 50. Still greater frequency variations of up to more than 1:1000 can be obtained with Zener diodes selected for the same voltage $U_Z$ and with a very critical adjustment of the operating voltage $U_{OK}$. The sensitivity to variations in operating voltage, the stabilization of the collector voltage by the Zener diodes and the action of the blocking capacity of the Zener diodes can be overcome by the introduction of the series-resistors 7 and 8.

In the circuit arrangement so far described, the frequency is inversely proportional to the base resistance. However there is a series of applications wherein the frequency is required to be controllable within wide limits by a current or a voltage, as far as possible with linear dependency.

Figure 2:
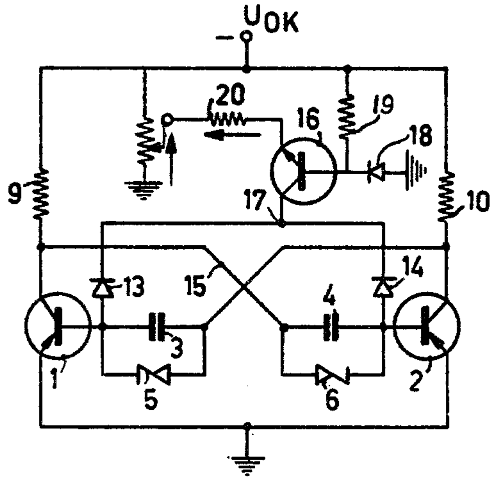
FIGURE 2 shows a modification of the arrangement of FIG. 1 having a complementary transistor as the base resistor of the inter-connected transistors.

For such applications, the circuit arrangement shown in FIG. 2 offers an advantageous solution. The common base resistor is replaced by an npn-type transistor 16. This transistor 16, which is of a complementary conductivity relative to the interconnected transistors 1 and 2, is operated in one of the known connections with high differential internal resistance, for example, in grounded-base connection, and has therefore an excellent constant current-characteristic over the whole positive range of, for example, of collector-base voltage. This favorable behavior has no equivalent with pentode tubes because of their comparatively high knee voltage. Also circuits utilizing complementary transistors cannot be translated into the tube-technique, since only one kind of charge carriers exists in tubes, namely electrons.

Since the transistors 1 and 2 respectively are only switched over at a low negative voltage to which is added, at point 17, the threshold voltage of the just conducting diode 13 or 14, the transistor 16 receives a low negative base-bias $U_{D18}$ which is produced through a resistor 19 across a silicon diode 18. This diode 18 has a low differential passage-resistance and also the base current of transistor 16 is small relative to the current flowing through resistor 19. The bias potential thus produced may therefore be regarded as constant.

The fact that the collector current of transistor 16 is substantially independent of voltage and equal to the current supplied to its emitter ($\alpha \approx 1$) results in the discharges of the capacitor no longer varying exponentially, but linearly. This gives rise to a linear dependency between the multivibrator frequency and the emitter current.

Since a transistor in grounded-base connection has a very low input resistance the emitter current is substantially limited by a resistor 20 connected in series with the emitter, so that a substantially linear dependency also exists between the multivibrator frequency and the emitter bias potential.

Figure 3:
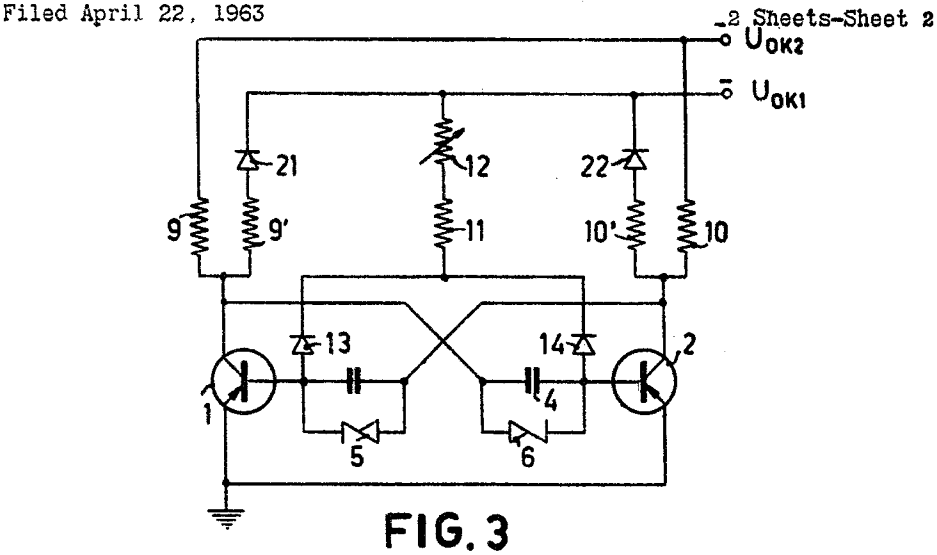
FIGURE 3 shows a variant of the arrangement of FIG. 1 having in addition, switchable collector resistors.

A circuit arrangement which not only utilizes shunted capacitors with voltage dependency, but also switchable collectors-resistors is shown in FIG. 3. This arrangement does indeed not enter so much into consideration for a linear frequency control, since in addition to the resistance control, a voltage control effective in the same direction occurs, but due to this very reason it permits a frequency variation of more than 1:1000 without difficulty. Since the cut-off transistor sees a high collector resistance when passing into the conducting state its behaviour on switching-over is excellent even if resistor 12 has a very high value (low frequencies). In addition to the resistors 9 and 10 connected to the operating voltage $U_{OK2}$, there are provided resistors 9' and 10' respectively, connected in series with diodes 21 and 22 respectively and connected to the operating voltage $U_{OK1}$. During the charging process, the small collector resistors 9' and 10' are effective. When the charging voltage of the capacitor, which is substantially equal to the collector voltage of the cut-off transistor, exceeds the value of $U_{OK1}$ the diodes 21 and 22 respectively are cut-off and from then onwards only the large collector resistors 9 and 10 respectively are effective. The two operating voltages $U_{OK1}$ and $U_{OK2}$, as well as the Zener voltage $U_Z$ differ sufficiently, for example $U_{OK1} = \frac{1}{2} U_Z = \frac{1}{3} U_{OK2}$, to render the arrangement insensitive to voltage variations.

Figure 4:
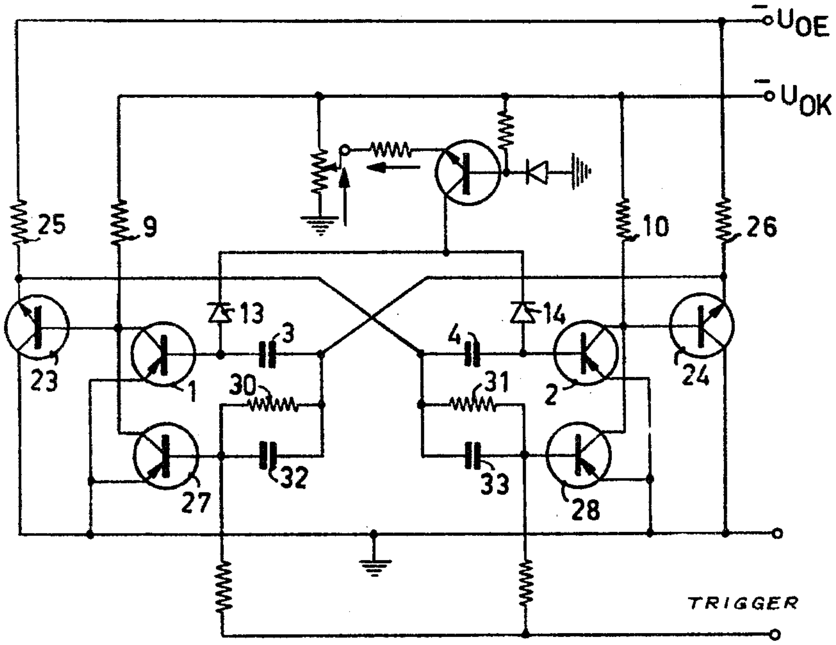
FIGURE 4 shows a circuit arrangement representing a combination of an astable multivibrator and a bistable multivibrator.

FIG. 4 shows an improved circuit arrangement which permits a frequency variation of 1:7700, the linear range extending from 14 c./s. to about 70 kc./s. corresponding to a linear variation of 1:5000. This arrangement is a combination of an astable multivibrator and a bistable multivibrator. The transistors 1 and 2 are associated with the astable portion. The feedback path is closed through emitter followers 23 and 24 respectively, which are of opposite conductivity type relative to the transistors 1 and 2. They make it possible for the resistors 9 and 10 respectively to be chosen of comparatively high values in order to obtain a favourable switching-over at low frequencies (high base resistance), while the resistors 25 and 26 respectively may have low values for short charging times.

Transistors 27 and 28 form the bistable portion and fulfill the function of switches connected in parallel with the collector-emitter paths of the transistors 1 and 2 respectively. As long as a sufficient charging current flows, for example, from the base of transistor 2, this transistor is over driven. As the charging current decreases, the emitter of transistor 23 becomes more negative. The transistor 28 is thus switched into circuit through a resistor 31 and holds the common connection to the collectors of the transistors 2 and 28 at earth potential when the transistor 2 is cut off again.

The switch-on command (cut-off period conducting period) is transferred by the coupling capacitors 3, 4 and through the transistors 1 and 2 respectively, while the transistors 27 and 28 respectively follow only at the end of the charging process and maintain the new condition. The switch-off command (condition period-cut-off period) however is transferred byt he transistor 27 and 28 respectively, since one of the transistors 1 and 2 connected in parallel therewith, is at this moment already cut-off in part or wholly. When astably coupled transistor 1 or 2 begins to change state, the change of potential in their respective collectors, coupled through either transistor 23 or 24 causes transistor 28 or 27, respectively, to receive the switch-off command through capacitor 32 or 33 the charge of which serves to neutralize as quickly as possible the charge accumulated in the base during the period of conduction. In the prior art circuits, this neutralization charge has to be derived from the coupling capacitors 3 and 4 respectively. Consequently, at the beginning of the discharging process, only a voltage a little lower than the charging voltage is available, which has as a consequence a correspondingly smaller duration of the cycle. This effect does not disappear unless the base capacitance effective in the over driven condition can be made very low relative to that of the capacitors 3 and 4 respectively.

At the same moment at which, for example, transistor 27 cuts off, the capacitor 4 begins to be charged through resistor 25. An exponentially-decreasing voltage is obtained at the emitter of transistor 23. As long as the emitter voltage of transistor 23 is more positive than $U_{OK}$, the emitter-base diode of transistor 23 remains cut-off. At the common collector connection of transistors 1 and 27, a voltage pulse is thus obtained having, in addition to a steep positive edge, also a steep negative edge. The circuit arrangement shown in FIG. 4 utilizes two different negative operating voltages $U_{OE}$ and $U_{OK}$. One may, for example, choose $U_{OE}=2\times U_{OK}$.

What is claimed is:

1. A multivibrator comprising first and second transistors each having an output, control and common electrode, a first source of reference potential, resistive means independently connecting the output electrodes of the said transistors to the first source of reference potential, a second source of reference potential, means connecting the common electrodes to the said second source of reference potential, first means including a capacitor interconnecting the output electrode of the first transistor and the control electrode of the second transistor, second means including a capacitor interconnecting the output electrode of the second transistor and the control electrode of the first transistor, means including a variable impedance connected between the first source of reference potential and to the common connection of two unidirectional current conductors each of which has its non-common terminal connected to the control electrode of a different transistor, first switch means coupled to the first transistor output electrode for maintaining the second transistor output electrode voltage at its overdriven value during substantially the entire conduction period of said second transistor, and second switch means coupled to the second transistor output electrode for maintaining the first transistor output electrode voltage at its overdriven value during substantially the entire conduction period of said first transistor.

2. A multivibrator as set forth in claim 1 in which said means including a variable impedance between the first source and the common connection of the two unidirectional current conductors comprises a transistor of complementary type to said first and second transistors connected as a grounded base amplifier and with its emitter collector path connected between a potentiometer connected to the first source of reference potential and the common connection of the unidirectional conductors, respectively.

3. A multivibrator comprising first and second transistors each having an output, control and common electrode, a first source of reference potential, resistive means independently connecting the output electrodes of the said transistors to the first source of reference potential, a second source of reference potential, means connecting the common electrodes to the said second source, first means including a capacitor interconnecting the output electrode of the first transistor and the control electrode of the second transistor, second means including a capacitor interconnecting the output electrode of the second transistor and the control electrode of the first transistor, means including a variable impedance connected between the first source of reference potential and to the common connection of two unidirectional current conductors each of which has its non-common terminal connected to the electrode of a different transistor, a first zener diode connected across said first means for short circuiting said first means at the zener reverse breakdown voltage which is selected to maintain said second transistor overdriven during its conduction cycle, and a second zener diode substantially identical to the first connected across said second means for short circuiting said second means at the zener reverse breakdown voltage which is substantially the same as the reverse breakdown voltage of the first zener diode to maintain said first transistor overdriven during its conduction cycle.

4. A multivibrator as set forth in claim 3 in which said means including a variable impedance between the first source and the common connection of the two unidirectional current conductors comprises a transistor of complementary type to said first and second transistors connected as a grounded base amplifier and with its emitter collector path connected between a potentiometer connected to the first source of reference potential and the common connection of the unidirectional conductors, respectively.

5. A multivibrator as set forth in claim 3 in which the resistive means independently connecting the output electrodes to the first source of reference potential comprises, a first resistor connecting the output electrode of said first transistor to the first reference source, a second resistor connecting the output electrode of the second transistor to the first source, a first series circuit including a resistor and a unidirectional current conductor connecting said output electrode of the first transistor to an auxiliary potential source, and a second series circuit including a resistor and a unidirectional current conductor connecting the output electrode of the second transistor to the said auxiliary potential source, said first and second resistors being substantially equal and exceeding the impedance of the first and second series circuits, respectively, and said auxiliary potential source having a value substantially less than the first potential source whereby the first and second means including the capacitors are charged through the low impedance circuit.

6. A multivibrator comprising first and second transistors each having an output, control and common electrode, a first source of reference potential, resistive means independently connecting the output electrodes of said transistors to the said first potential source, a second source of reference potential, means connecting the common electrodes of said transistors to the second potential source, first means including a capacitor interconnecting the output electrode of the first transistor and the control electrode of the second transistor, second means including a capacitor interconnecting the output electrode of the second transistor and the control electrode of the first transistor, means including a variable impedance connected between the first potential source and to the common connection of two unidirectional current conductors each of which has its non-common terminal connected to the control electrode of a different transistor, first switch means coupled to the first transistor output electrode voltage for short circuiting the common electrode-output electrode path of the second transistor to maintain the second transistor output electrode voltage at its overdriven value during substantially the entire conduction period of said second transistor, and second switch means coupled to the second transistor output electrode voltage for short circuiting the common electrode-output electrode path of the first transistor to maintain the first transistor output electrode voltage at its overdriven value during substantially the entire conduction period of said first transistor.

7. A multivibrator as set forth in claim 6 in which said means including a variable impedance between the first source and the common connection of the two unidirectional current conductors comprises a transistor of complementary type of said first and second transistors connected as a grounded base amplifier and with its emitter collector path connected between a potentiometer connected to the first source of reference potential and the common connection of the undirectional conductors, respectively.

8. A multivibrator as set forth in claim 6 in which said first switch means includes a first switching transistor having an output, control and common electrode, said common-output electrode path shunting the common-output electrode path of said second transistor, and first circuit means including a capacitor connecting the first switching transistor control electrode to the ouput electrode of the first transistor, and said second switch means includes a second switching transistor having an output, control and common electrode, said common-output electrode path shunting the common-output electrode path of said first transistor, and second circuit means including a capacitor connecting the second switching transistor control electrode to the output electrode of the second transistor.

9. A multivibrator as set forth in claim 6 in which said first and second means interconnecting the output and control electrodes of the first and second transistors, respectively, each include an emitter follower transistor and a capacitor connected in series.

References Cited by the Examiner

UNITED STATES PATENTS

| | | | |
|---|---|---|---|
| 2,536,822 | 1/1951 | Slaymaker et al. | 331—144 |
| 2,598,516 | 5/1952 | Dickinson | 331—144 |
| 2,636,985 | 4/1953 | Weissman | 331—144 X |
| 2,737,587 | 3/1956 | Trousdale | 331—144 X |
| 2,848,610 | 8/1958 | Freienmuth | 331—144 |
| 2,879,412 | 3/1959 | Hoge et al. | 331—113 X |
| 3,077,567 | 2/1963 | Gray | 331—113 X |

FOREIGN PATENTS

| | | |
|---|---|---|
| 1,042,641 | 11/1958 | Germany. |

OTHER REFERENCES

RCA Computer-Transistor and Tunnel Diode Application Circuits, Sheet No. 2, Circuit Entitled "High-Speed 'Set-Reset' 'Flip-Flop' Utilizing Type 2N1301 or 2N795."

ROY LAKE, *Primary Examiner.*

JOHN KOMINSKI, *Examiner.*